US008327230B2

(12) United States Patent
Ni et al.

(10) Patent No.: US 8,327,230 B2
(45) Date of Patent: Dec. 4, 2012

(54) DATA STRUCTURE FOR FLASH MEMORY AND DATA READING/WRITING METHOD THEREOF

(75) Inventors: Jian-Qiang Ni, Jiang Su (CN); Dong-Yu He, Jiang Su (CN); Chun-Ting Liao, Changhua (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 13/344,671

(22) Filed: Jan. 6, 2012

(65) Prior Publication Data

US 2012/0110419 A1 May 3, 2012

Related U.S. Application Data

(62) Division of application No. 12/122,768, filed on May 19, 2008, now Pat. No. 8,122,303.

(30) Foreign Application Priority Data

May 25, 2007 (TW) ............................... 96118884 A

(51) Int. Cl.
*G11C 29/00* (2006.01)

(52) U.S. Cl. ........................................ 714/768; 714/733

(58) Field of Classification Search .................. 714/768, 714/773

See application file for complete search history.

(56) References Cited

U.S. PATENT DOCUMENTS

| | | | | |
|---|---|---|---|---|
| 6,604,214 | B1 | 8/2003 | Fukushima | |
| 7,409,492 | B2 | 8/2008 | Tanaka et al. | |
| 2004/0117688 | A1 | 6/2004 | Vainsencher et al. | |
| 2007/0233931 | A1 * | 10/2007 | Tanaka et al. | 711/5 |
| 2007/0280002 | A1 * | 12/2007 | Sudhindra Prasad | 365/185.29 |
| 2008/0288712 | A1 | 11/2008 | Cornwell et al. | |

* cited by examiner

*Primary Examiner* — M. Mujtaba K Chaudry

(74) *Attorney, Agent, or Firm* — McClure, Qualey & Rodack, LLP

(57) ABSTRACT

A data structure for a flash memory and data reading/writing method thereof are disclosed. A 512 bytes data and a redundant code derived from the data encoded with a 6-bit error correcting code scheme are stored in a first sector and a second sector with sequential address in a block of the flash memory respectively. A logic block address information of this block is divided into two parts that are stored in the first sector and the second sector respectively.

3 Claims, 7 Drawing Sheets

40 reading the data and redundant code and performing an ECC decoding process on the data based on the redundant code No 41 Is the ECC decoding process is completed ?

Yes 42 outputting the processed data

No

43 Is the number of stored byte with "0xff" exceeds a threshold value ?

Yes 44 marking the sector to be an erased sector

45 Should the sector be performed the ECC decoding process based on the ECC correcting Information ?

No

Yes 46 marking the block has uncorrectable error

DATA STRUCTURE FOR FLASH MEMORY AND DATA READING/WRITING METHOD THEREOF

CROSS-REFERENCE TO RELATED APPLICATION

The present application is a division of U.S. application Ser. No. 12/122,768, filed May 19, 2008, which claims priority to Taiwan Application No. 096118884, filed on May 25, 2007.

FIELD OF THE INVENTION

The present invention relates to a data structure applied for flash memory and data reading/writing method thereof, and more particularly to a data structure comprising a redundant code which includes 6-bit error correcting code (ECC) and data reading/writing method thereof.

BACKGROUND OF THE INVENTION

Flash memory has become a very popular data storage apparatus nowadays. However, the data stored in flash memory may become erroneous due to occasional electrical noise, or due to random, non-repetitive bit arrangement in memory cell caused by the limited access speed as a result of the material characteristic of the flash memory. To maintain the correctness of the data stored in the logic memory cell, additional checking codes composed of bits are usually inserted into the data for locating and correcting the error bit(s). This data protection scheme is called error correction code (ECC) checking.

FIG. 1*a* illustrates a schematic view of the data structure of a flash memory in accordance with the conventional art. The flash memory 1 comprises a plurality of blocks 11, each block 11 comprises a plurality of pages 12 each composed of at least one sector 13, and each sector 13 comprises at least a data area 131 and a spare area 132. Because the minimum transmission data amount of the typical Integrated Device Electronic interface (IDE-ATA) is 512 bytes, the storing space of the data area 131 is generally 512 bytes and the storing space of the spare area 132 is 16 bytes.

FIG. 1*b* illustrates a schematic view of the data structure of the spare area 132 of the flash memory in accordance with the conventional art. The spare area 132 comprises bad memory information 141, ECC checking information 142, logic block address (LBA) information 143, split block logic sector address (SBLSA) information 144, and a redundant code 145 for ECC. The redundant code 145 is derived from the data by encoding with certain ECC scheme.

Generally, the storing space of the bad memory information 141 is one byte, which comprises bad block information and bad page information. The bad block information is for indicating whether this block is a defective block and the bad page information is for indicating whether this page is a defective page. The storing space of the ECC checking information 142 is one byte, and the ECC checking information 142 is for indicating whether the ECC checking should be executed. The storing space of the logic block address information 143 is two bytes. The storing space of the split block logic sector address information 144 is two bytes. The storing space of the ECC redundant code 145 is 10 bytes.

The flash memory in accordance with the conventional art is commonly encoded with a 4-bit ECC scheme to generate a 10-byte redundant code, which can then be stored in the data structure illustrated in FIG. 1*b*. Because data protection attracts much attention, using an ECC scheme with more bits becomes a trend of designing flash memory. However, since the redundant code of a 6-bit ECC scheme requires a storing space of 15 bytes, the redundant code of the 6-bit ECC scheme cannot be stored in the conventional data structure as illustrated in FIG. 1*b*. What is needed is then to dispose a data structure with stronger data protection and error correction ability in a limited storing space of the flash memory.

SUMMARY OF THE INVENTION

Therefore, it is one objective of the present invention to provide a data structure applied for flash memory and data reading/writing method thereof for a more efficient data protection scheme in the limited space of the flash memory.

In an embodiment of the present invention, a data structure applied for a flash memory is provided to store a 512 bytes data and a redundant code in a first sector and a second sector which are two neighboring sectors in a block of flash memory respectively. The redundant code is derived from the data encoded with a 6 bits ECC scheme. The logic block address information of this block is divided into two parts which are stored in the first sector and the second sector respectively.

In an embodiment of the present invention, a data reading method applied for a sector of the flash memory which includes a data, an ECC checking information and a redundant code, comprises following steps of:

i) performing an ECC decoding process on the data based on the redundant code;

ii) determining whether the ECC decoding process is completed, and outputting the processed data if the ECC decoding process is completed;

iii) determining whether the number of stored byte sequence with a predetermined value in the data exceeds a threshold value if the ECC decoding process can not completed;

iv) marking the sector to be an erased sector if the number of stored byte sequence with predetermined value in the data exceeds the threshold value; and v) determining whether this sector has uncorrectable error or this sector is an erased sector based on the ECC checking information if number of stored byte sequence with the predetermined value does not exceed the threshold value.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

The present invention relates to a data structure for flash memory and data reading/writing method. While the specifications describes several example embodiments of the invention, it should be understood that the invention can be implemented in many ways and is not limited to the particular examples described below or to the particular manner in which any features of such examples are implemented.

Figure 1A:
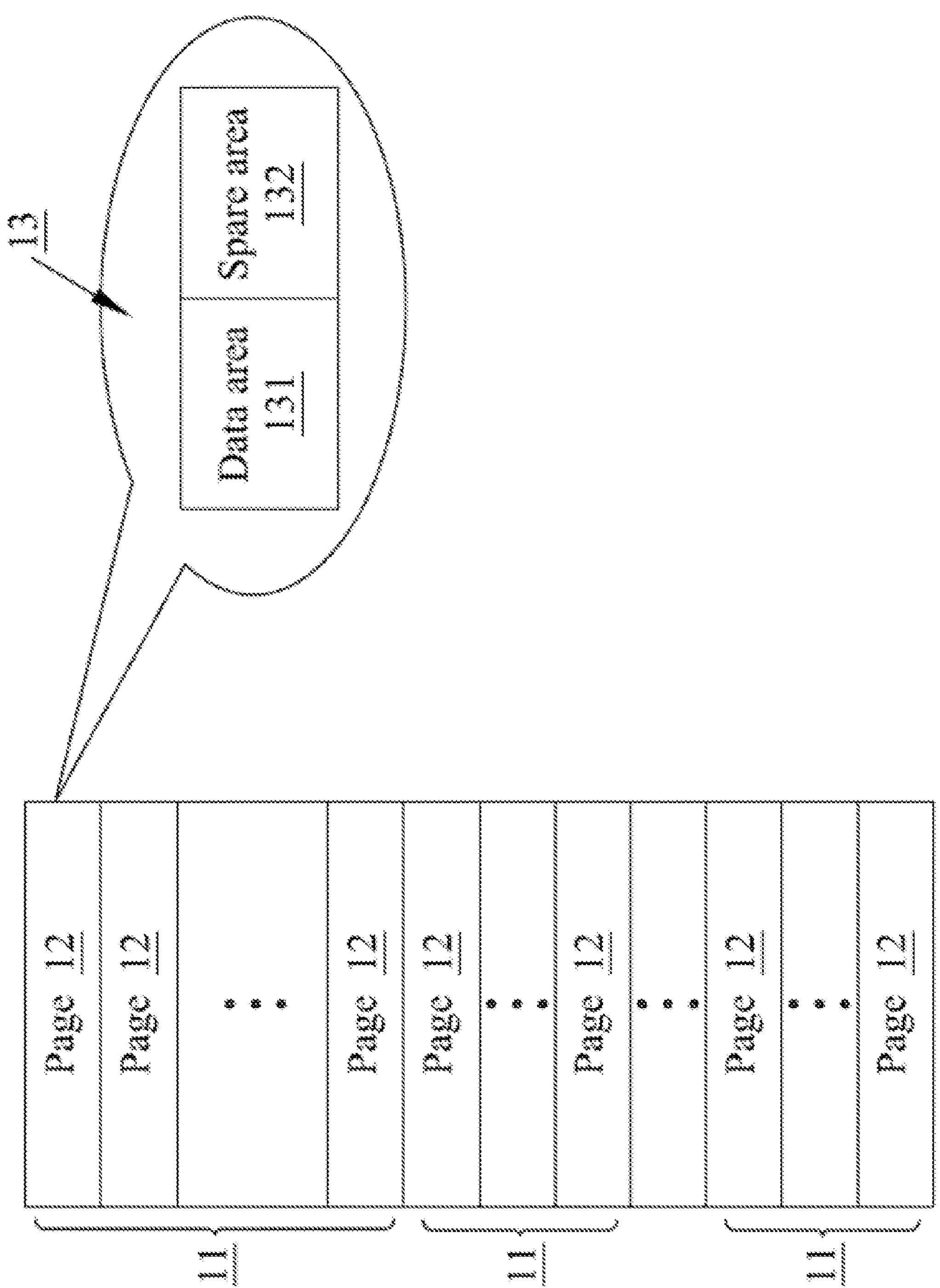
FIG. 1*a* illustrates a schematic view of the data structure of a flash memory in accordance with the conventional art.
Figure 1B:
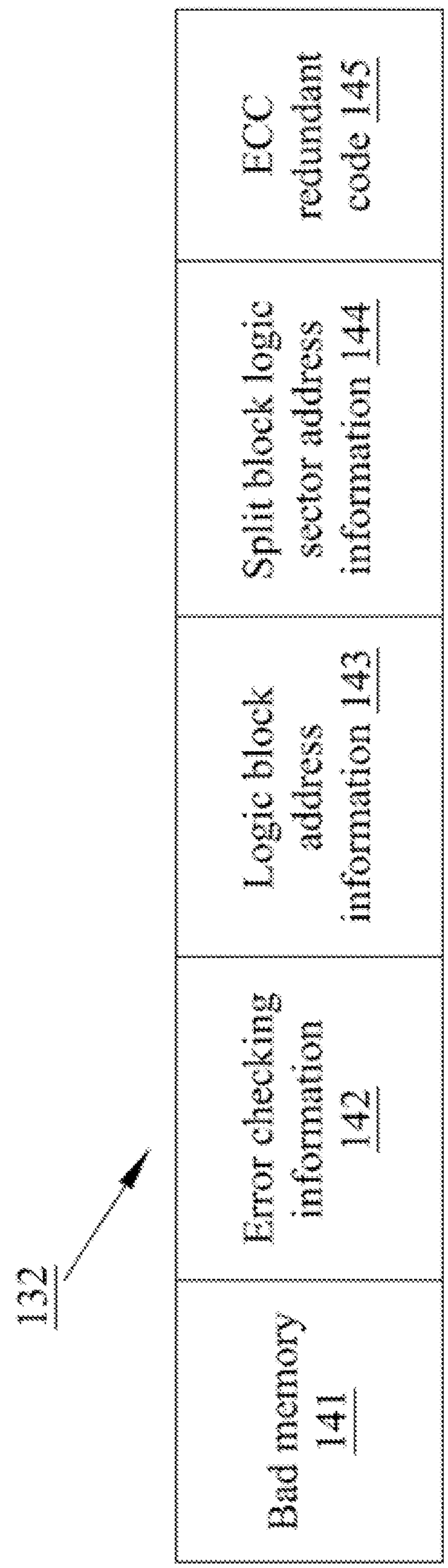
FIG. 1*b* illustrates a schematic view of the data structure of the spare area of the flash memory in accordance with the conventional art.
Figure 2:
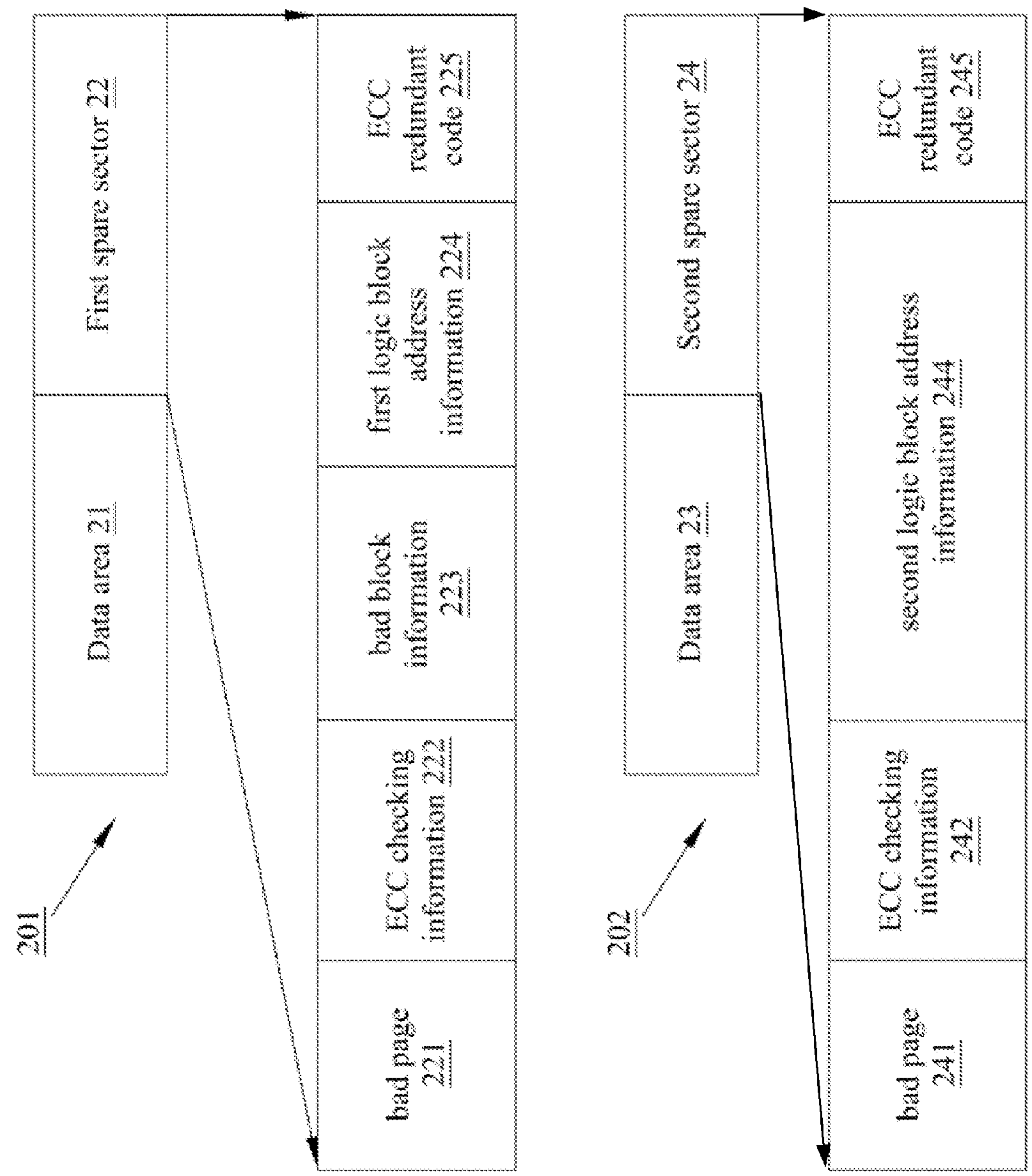
FIG. 2 illustrates a schematic view of the data structure of a flash memory in accordance with an embodiment of the present invention.

Referring to FIG. 2 for a schematic view of the data structure for flash memory in accordance with an embodiment of the present invention, the sector 201 and the sector 202 are two neighboring sectors, wherein the sector 201 includes a data area 21 and a first spare area 22, and the sector 202 includes a data area 23 and a second spare area 24. The storing space of the data area 21 or the data area 23 is 512 bytes, and the storing space of the spare area 22 or the spare area 24 is 16 bytes.

Since when a 6-bit ECC scheme is applied for encoding data, the storing space required by the generated redundant code is 15 bytes, and only one byte of space for storing other information is left for each of the first spare area 22 and the second spare area 24 after storing the redundant code. Because the remaining space is too small to store other information for each sector separately, in the present invention such other information is then stored using jointly the remaining spaces of the two neighboring sectors.

In this embodiment, the first spare area 22 is used for storing bad page information 221 of one bit, ECC checking information 222 of one bit, bad block information 223 of one bit, the first the logic block address information 224 of five bits, and the ECC redundant code 225 of fifteen bytes. The second spare area 24 is used for storing bad page information 241 of one bit, error checking information 242 of one bit, second logic block address information 244 of six bits, and ECC redundant code 245 of fifteen bytes.

A complete logic block address can be obtained by combining the first part of the logic block address information 224 and the second part of the logic block address information 244. The ECC redundant code 225 and the ECC redundant code 245 are derived from the data encoded with a 6-bit ECC scheme.

Figure 3:
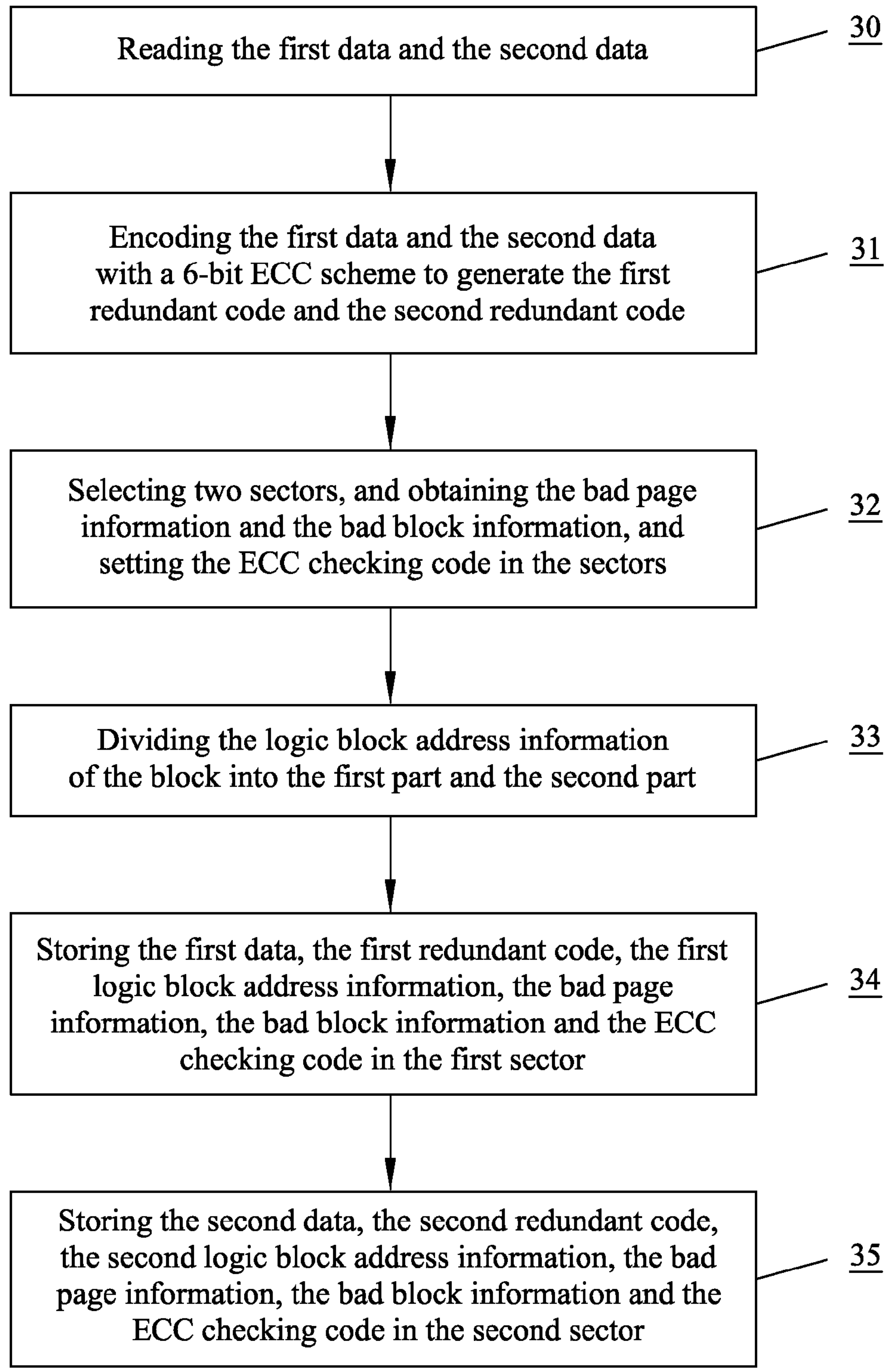
FIG. 3 illustrates a flow diagram of the data writing method in accordance with an embodiment of the present invention.

Referring to FIG. 3 for a flow diagram of a data writing method in accordance with an embodiment of the present invention, the method is applied for writing data into a sector of a flash memory and includes the following steps of:

Step 30: receiving the first data and the second data, each requiring a storing space of 512 bytes.

Step 31: encoding the first data and the second data with the 6-bit ECC scheme, to generate the first redundant code and the second redundant code. The storing space required by each of the first redundant code and the second redundant code required is fifteen bytes.

Step 32: selecting the first sector and the second sector which are two neighboring sectors in the block, obtaining the bad page information and the bad block information of the two sectors, and setting the ECC checking information for the two sectors.

Step 33: dividing the logic block address information of this block into a first logic block address information of 5 bits and a second logic block address information of 6 bits.

Step 34: storing the first data, the first redundant code, the first logic block address information, the bad page information, the bad block information, and the ECC checking information into the first sector based on the data structure illustrated in the sector 201 of FIG. 2.

Step 35: storing the second data, the second redundant code, the second logic block address information, the bad page information, the bad block information, and the ECC checking information into the second sector based on the data structure illustrated in the sector 202 of FIG. 2.

When reading data from the flash memory, the sector storing data may be in one of the following three statuses:

1. Data has been written in this sector, and the data can be decoded and can be successfully read out.

2. Data has been written in this sector, but the data cannot be decoded and cannot be successfully read out.

3. This sector is an erased sector and has not been written with data.

Generally, whether this sector has been written with data can be determined by examining the ECC checking information stored in the sector, and the redundant code can be then used to check whether the data stored in the sector is correct. However, the data structure of the present embodiment uses only one bit to store the ECC checking information, and it is at all possible that data corruption occurs at the bit for storing the ECC checking information. As a result of the aforementioned, relying only upon the one-bit ECC checking information can easily lead to false judgment. The data reading method of the present invention described below can reduce the probability of false judgment.

Figure 4:
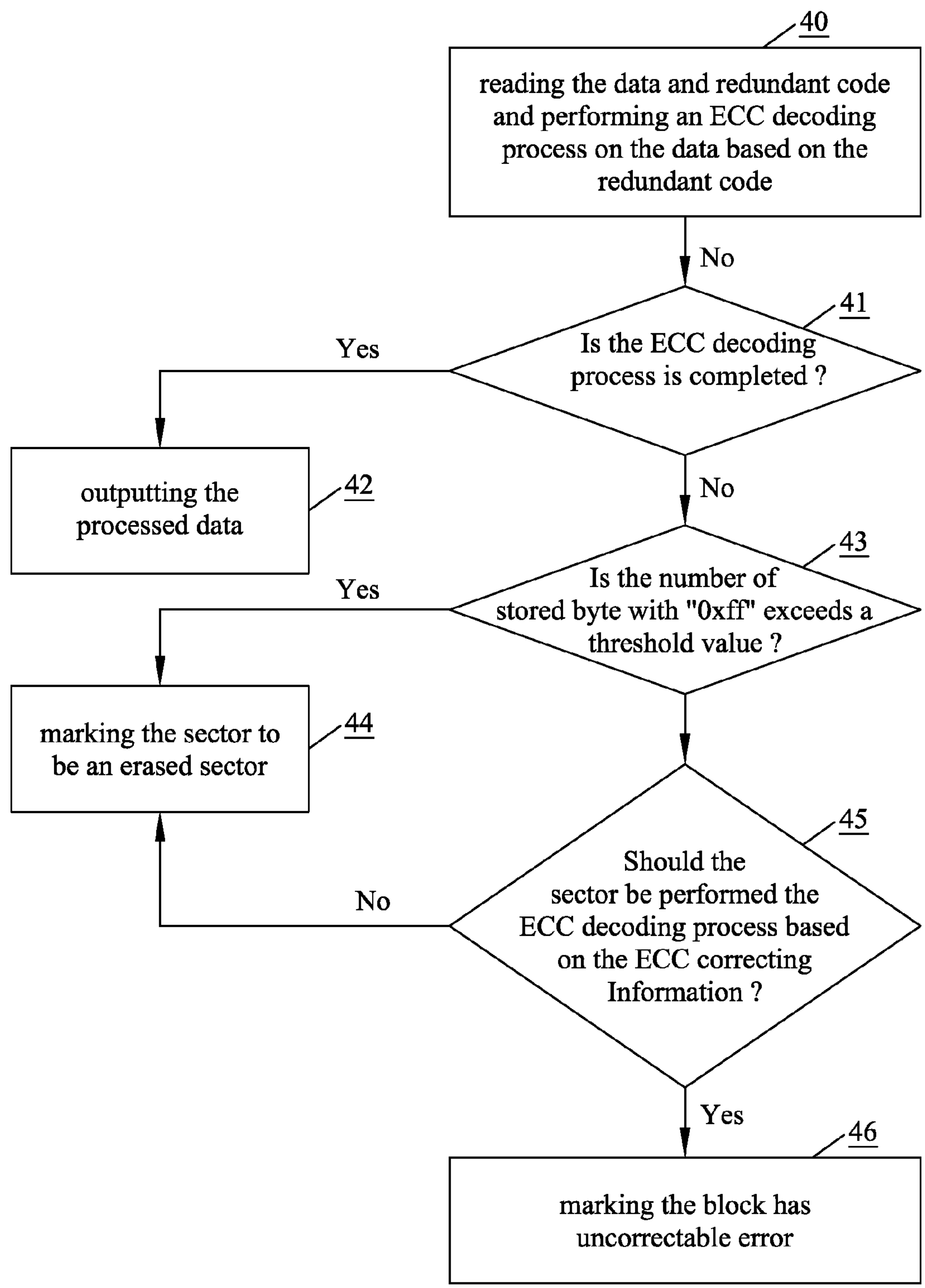
FIG. 4 illustrates a flow diagram of the data reading method in accordance with another embodiment of the present invention.

Referring to FIG. 4 for a flow diagram of an embodiment of the data reading method in accordance with an embodiment of the present invention, the method includes the following steps of:

Step 40: reading the data and the redundant code stored in a sector and performing an ECC decoding process on the data based on the redundant code, for error-checking and correcting the data.

Step 41: determining whether the ECC decoding process is completed. If the ECC decoding process is completed, proceed to step 42. If the ECC decoding process is not completed, proceed to step 43. If the number of error bits detected exceeds what the ECC scheme can tolerate, the ECC decoding process is considered failing.

Step 42: outputting the corrected data.

Step 43: determining whether the number of stored byte sequence with value of "0×ff" exceeds a threshold value. If this number does exceed the threshold, proceed to step 44; if this number does not exceed the threshold, then proceed to step 45.

Step 44: marking this sector to be an erased sector.

Step 45: determining whether the ECC decoding process should be performed to this sector based on the ECC checking information stored in this sector. If the ECC decoding process should be performed, proceed to step 46; if the ECC decoding process should not be performed, then proceed to step 44.

Step 46: marking this block as having uncorrectable error.

Preferably, the flash memory mentioned above can be Multi Level Cell (MLC) or Single Level Cell (SLC).

Figure 5:
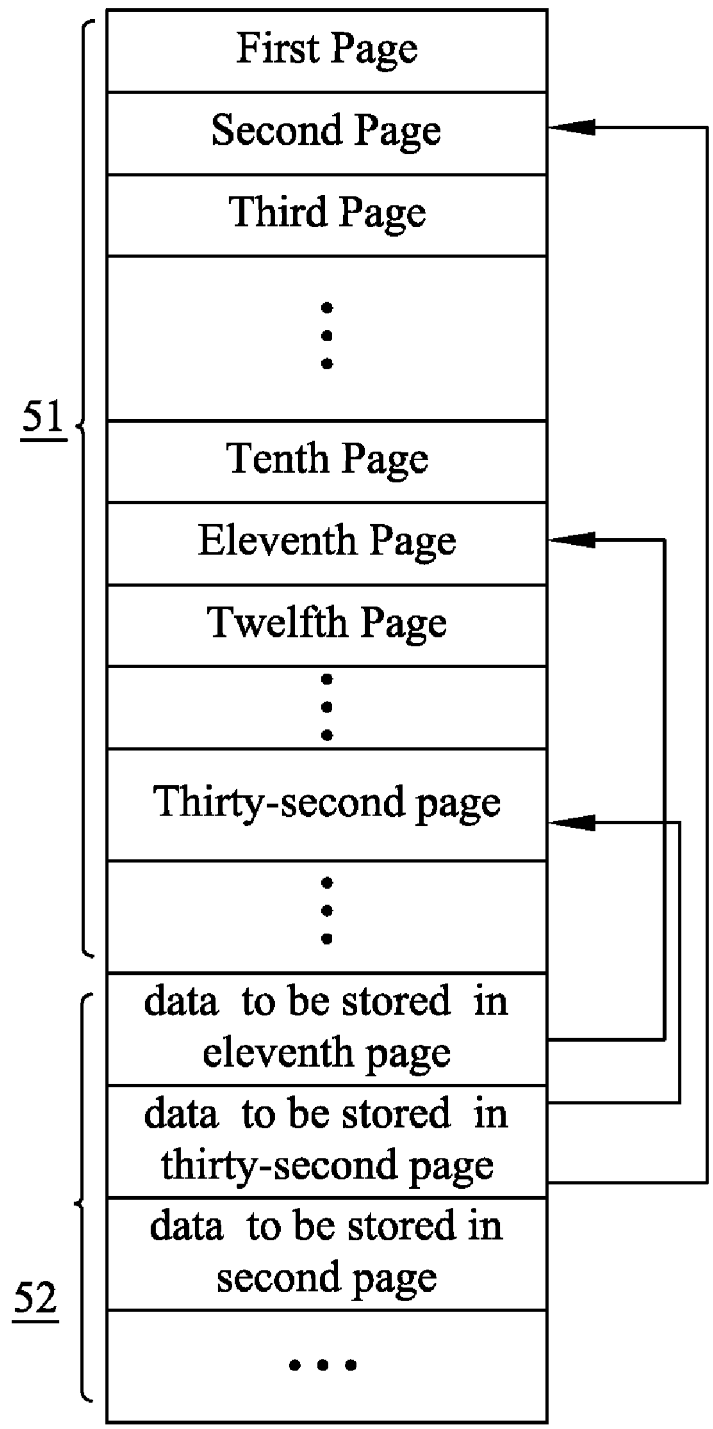
FIG. 5 illustrates a schematic view of a flash memory with split block structure.

Referring to FIG. 5 for a schematic view of the flash memory with split block structure, the flash memory 5 has a split block structure and includes the first block 51 and the second block 52, and the second block 52 serves as a data buffer. When data is to be written in the first block 51, it will first be written in the second block 52. The data stored in the second block 52 will then be sequentially written in the first block 51 when the second block 52 becomes full. Due to the nature of flash memory data access, the writing speed of the flash memory can become faster by using the split block structure. For example, as illustrates in FIG. 5, when the user wants to write data sequentially in page 11, page 32 and page 2, under the split block structure these data are first stored in the second block 52, and these data are then later written in page 11, page 32 and page 2 of the first block 51 according to the order of the page location when the second block 52 becomes full.

Because under the split block structure, the data temporarily stored in the second block 52 must further record additional location information regarding where the data is to be stored in the first block 51, it is then unsuitable to adopt the 6-bit ECC scheme in encoding the data temporarily stored in the second block 52.

Figure 6:
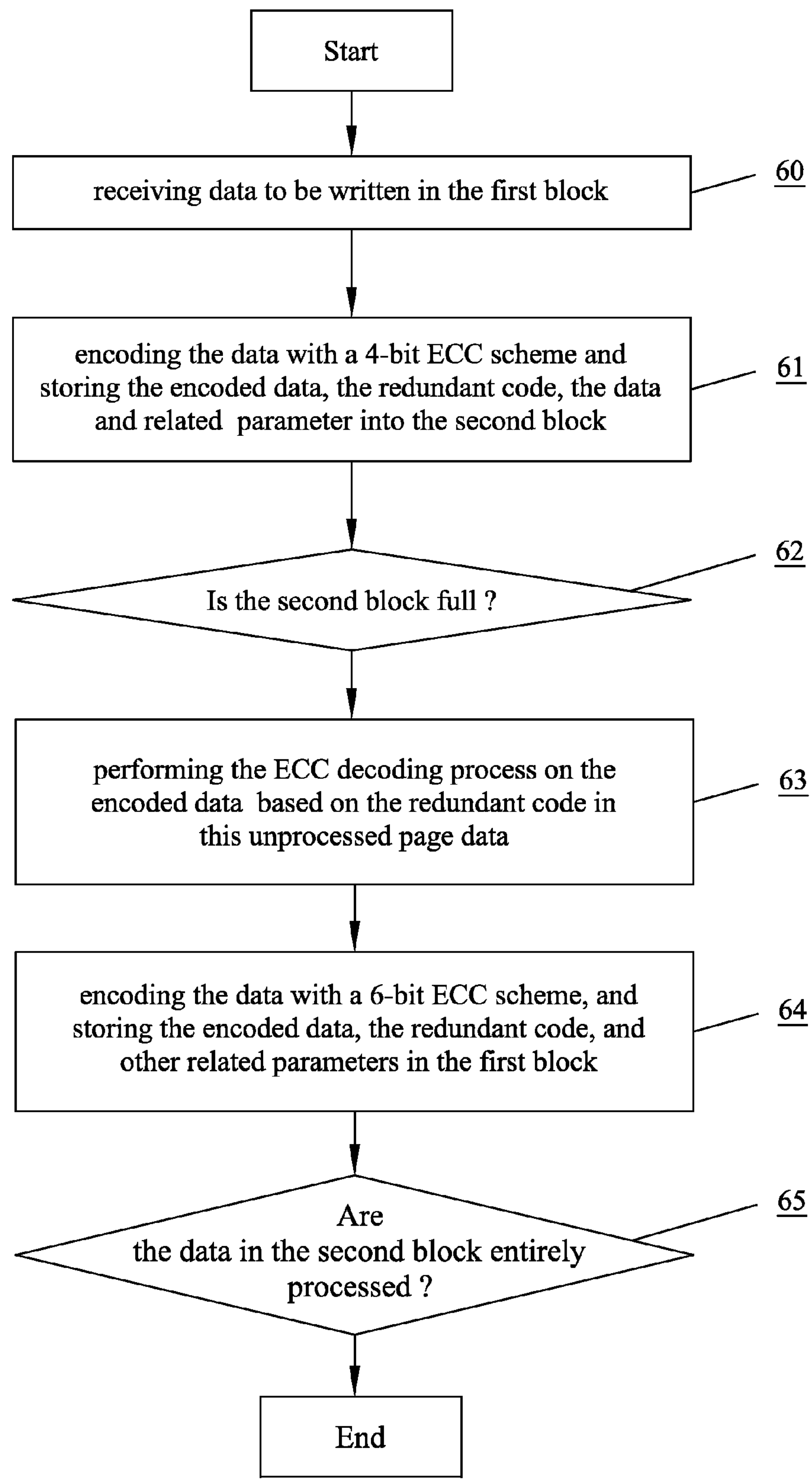
FIG. 6 illustrates the flow diagram of the operation process of the inventive data structure when applied to split block structure.

Referring to FIG. 6 for a flow diagram of the operation process of the flash memory with split block structure in accordance with an embodiment of the present invention, this operation process is performed corresponding to the flash memory 5 illustrated in FIG. 5, and includes the following steps of:

Step 60: receiving data to be written in the first block 51.

Step 61: encoding the data with a 4-bit ECC scheme and then storing the encoded data, the redundant code generated from the encoding process, the location information where the data will be stored in the first block 51, and related parameters into the second block 52.

Step 62: checking if the second block 52 is full. If the second block 52 is full, proceed to step 63; if second block 52 is not full, proceed to step 60.

Step 63: sequentially reading unprocessed page data from the second block 52, and performing the ECC decoding process on the encoded data based on the redundant code in this unprocessed page data, for checking and correcting the data.

Step 64: encoding the data with an 6-bit ECC scheme, and then storing the encoded data, the generated redundant code, and other related parameters into the first block 51 based on the data structure illustrated in FIG. 2.

Step 65: checking whether the data in the second block 52 are entirely processed. If the data in the second block 52 is entirely processed, end the flow process; if the data in the second block 52 are not entirely processed, proceed to step 63.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data reading method applied for a sector of a flash memory, said sector storing a data, an ECC checking information and a redundant code, and said method comprising the steps of:

(a) performing an ECC decoding process on said data based on said redundant code;

(b) determining whether or not said ECC decoding process is completed, and if said ECC decoding process is completed, outputting said processed data, and if said ECC decoding process is not completed, proceeding to step (c);

(c) determining whether a number of instances of a stored byte sequence with a predetermined value in said sector exceeds a threshold value, and if said number does exceed said threshold value, marking said sector to be an erased sector, and if said number does not exceed said threshold value, proceeding to step (d); and (d) determining whether said sector has uncorrectable error or said sector is an erased sector based on said error checking code.

2. The data reading method of claim 1, wherein said flash memory is Multi Level Cell or Single Level Cell.

3. The data reading method of claim 1, wherein said predetermined value is 0xff.

* * * * *